United States Patent [19]

Novey

[11] 3,874,630

[45] Apr. 1, 1975

[54] SAFETY MANUAL RELEASE SOLENOID VALVE

[76] Inventor: Richard T. Novey, 10090 Bromont St., Sun Valley, Calif.

[22] Filed: Jan. 26, 1973

[21] Appl. No.: 326,884

[52] U.S. Cl. ............... 251/68, 251/297, 251/331, 251/335 B
[51] Int. Cl. ............................................. F16k 31/00
[58] Field of Search ... 251/68, 297, 65, 331, 335 R, 251/335 B

[56] References Cited
UNITED STATES PATENTS

| 2,304,844 | 12/1942 | Parker | 251/68 |
| 3,212,751 | 10/1965 | Hassa | 251/65 |
| 3,399,695 | 9/1968 | Stehlin | 251/331 X |
| 3,430,658 | 3/1969 | Self | 251/297 X |
| 3,511,472 | 5/1970 | Zimmerman | 251/331 X |

FOREIGN PATENTS OR APPLICATIONS

| 1,300,764 | 7/1962 | France | 251/68 |

*Primary Examiner*—Harold W. Weakley

[57] ABSTRACT

A safety valve for shutting off the flow of liquid petroleum gas carried by a motor vehicle has a normally unseated valve element retained by a temporary detent against tension of a spring which is biased in a direction urging the valve element to closed position. A solenoid when energized by closing the starter switch on the motor vehicle acts upon the metal valve stem to disengage the temporary detent and draw the valve element to closed position. The valve element is returned to open position by hand.

4 Claims, 3 Drawing Figures

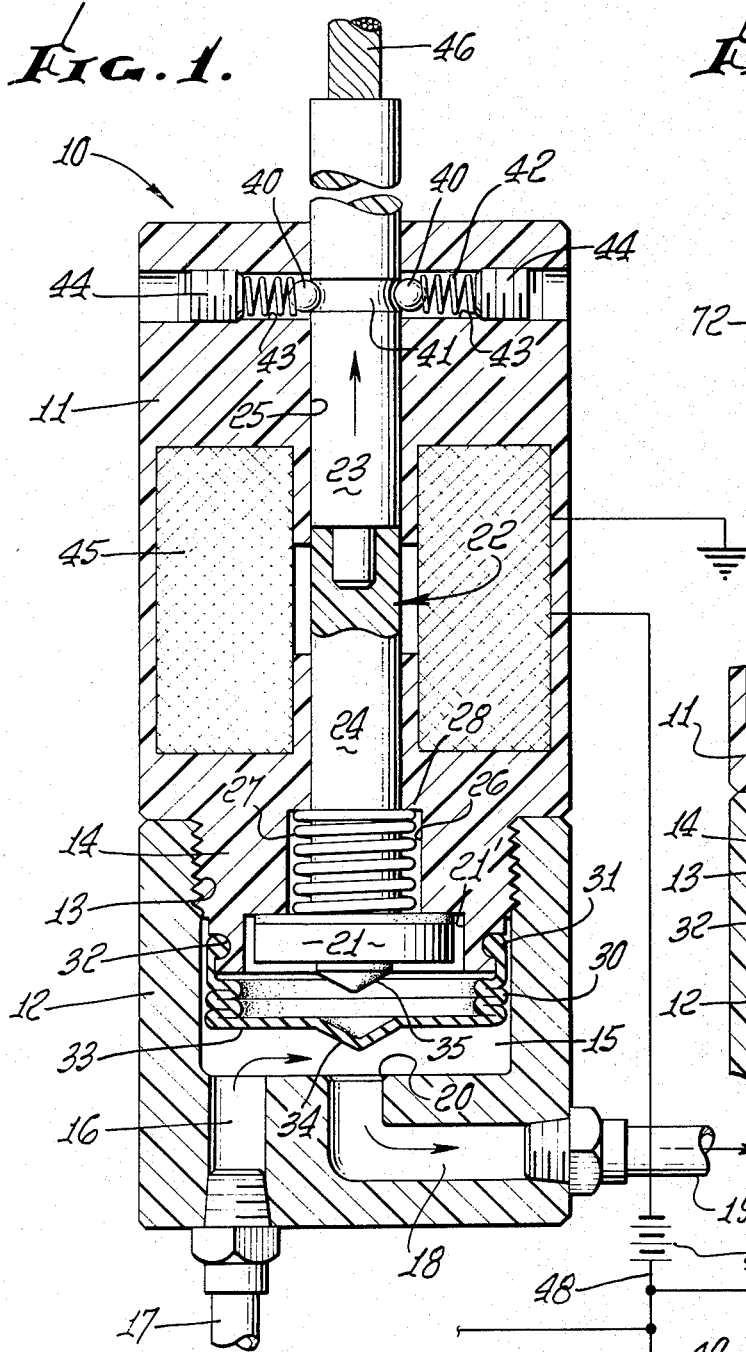
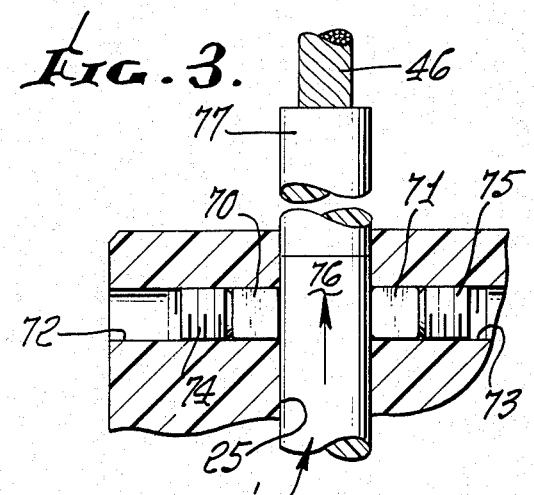
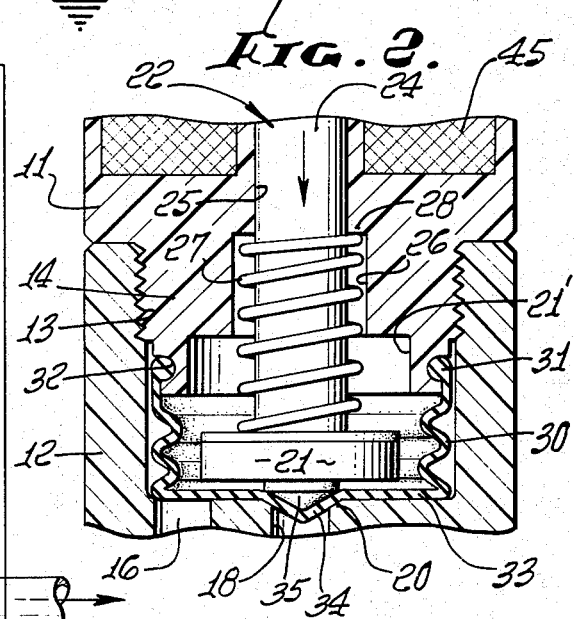
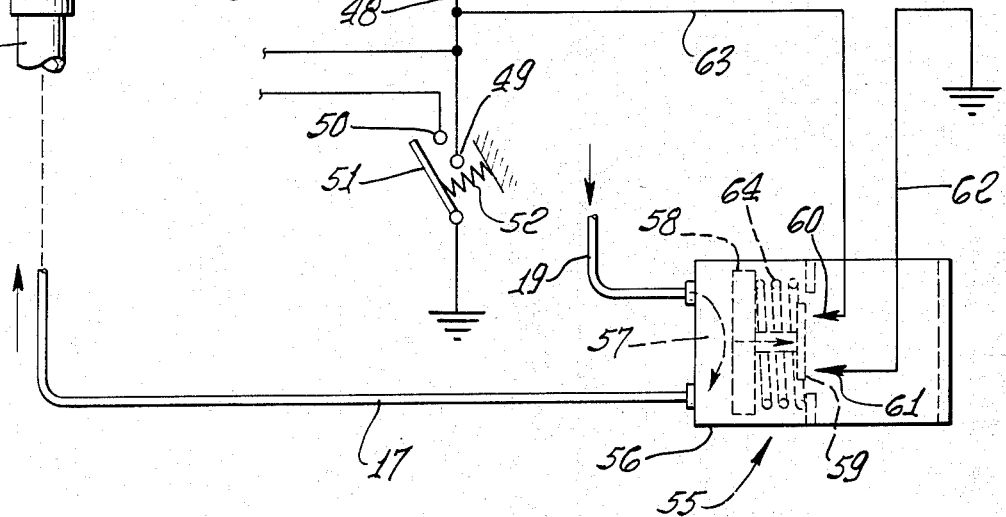
FIG. 1. FIG. 2. FIG. 3.

SAFETY MANUAL RELEASE SOLENOID VALVE

A currently popular source of fuel for vehicles such as campers and trailers is liquid petroleum gas. This is a gas supply carried by the vehicle itself which, because of its nature, is kept under relatively high pressure. The gas moreover is very volatile and needs careful handling. Gas leaks are to be avoided. Very commonly, the gas supply equipment as well as the items such as stoves and lamps which make use of the gas are carried on the vehicle itself. The usual practice is to keep all valves turned off until the vehicle is brought to a stop where its facilities are to be used and then the main gas supply is turned on. What often happens when the vehicle is to be driven away from the place of use is for the operator to overlook turning off the main gas supply. As a consequence, there is likely to be a gas leak somewhere in the system even though the valves on appliances such as the stove, are turned off. A vehicle with the main gas supply open as it travels over the highway creates a perilous situation which is to be avoided.

It is therefor among the objects of the invention to provide a new and improved safety valve for the main gas supply which supplies appliances which shuts off automatically whenever the vehicle which carries it is started in motion.

Another object of the invention is to provide a new and improved safety shut off valve for a gas supply useable with vehicle mounted liquid petroleum containers and appliances which is normally open but which is so equipped and interconnected with the ignition wiring of the motor on the vehicle that the valve is shut off automatically whenever the engine for the vehicle is started.

Still another object of the invention is to provide a new and improved safety manually released solenoid type valve adapted for use with a gas line of such character that it can be set manually in open position but which is connected electrically to the ignition circuit of the vehicle engine so that the vehicle cannot be driven away without shutting off the valve.

Further included among the objects of the invention is to provide a new and improved safety manual release solenoid type valve adapted to be carried by a vehicle equipped with a liquid petroleum gas supply wherein the valve is releasably held in open position subject to being closed by electric power when the combustion engine for the vehicle is started and wherein there is an additional pressure sensitive valve in the same liquid line electrically connected to the same solenoid shut off mechanism so that in the event of a sudden surge of high pressure in the liquid petroleum line for any reason the main supply line will be automatically shut off irrespective of whether the vehicle upon which it is carried is at rest or in motion.

With these and other objects in view, the invention consists in the construction, arrangement and combination of the various parts of the device, whereby the objects contemplated are attained as hereinafter set forth, pointed out in the appended claims, and illustrated in the accompanying drawings.

FIG. 1 is a longitudinal sectional view of the valve shown in open position and with the electric system shown schematically.

FIG. 2 is a fragmentary longitudinal sectional view of the valve element itself shown in closed position.

FIG. 3 is a fragmentary longitudinal sectional view of a modified type of detent.

In an embodiment of the invention chosen for the purpose of illustration there is shown a semi-automatic valve device indicated generally by the reference character 10 consisting of a two part housing. The housing is a simple cylindrical structure comprising a first upper section 11 and a second lower section 12. A threaded opening 13 in the lower section 12 accommodates a threaded projection 14 of the upper section 11, there being additionally provided a valve chamber 15 predominantly in the lower section 12. An inlet port 16 in the lower section 12 is supplied by a liquid gas line 17. An outlet port 18 in the second section is in communication with a liquid gas return line 19.

In the chosen embodiment there is provided an annular valve seat 20 at the entrance to the outlet port 18, the valve seat being concentrically disposed with respect to the valve chamber 15.

For opening and closing the valve seat use is made of a disc-like valve element 21 located in a recess 21' and carried by a valve stem indicated generally by the reference character 22. In the embodiment of FIGS. 1 and 2 the valve stem consists of a relatively long cylindrical metallic portion 23 and a slightly shorter plastic portion 24. The valve stem is freely slideably mounted in a bore 25 which extends through the first upper section 11. A recess 26 at the lower end of the bore 25 accommodates a spring 27, the spring bottoming against a shoulder 28 at one end and against the upper side of the valve element 21. In FIG. 1 the spring is under compression.

An accordian seal 30 has an O-ring flange 31 received in an annular recess 32 on the exterior of the threaded project 14. A transverse portion 33 of the seal is provided with a conical projection 34 centrally disposed and in alignment with a corresponding conical projection 35 protruding downwardly from the valve element 21.

Normally the valve element 21 is witheld in an open upward direction by action of spring pressed balls 40 which are received in an annular groove 41 on the metallic portion 23 of the valve stem. Spring 42 in respective bores 43 are retained by means of set screws 44.

A solenoid 45 is adapted, when energized, to pull the valve stem and particularly the metallic portion 23 thereof in a downward direction with sufficient force to overcome tension of the springs 42 thereby to release what amounts to a temporary detent which holds the valve element in open position. Once the temporary detent has been released the valve element 21 moves downwardly, first into engagement with the transverse portion 33 and then pressing the conical projection 34 into engagement with the valve seat 20 thereby to positively shut off flow of liquid petroleum gas from the supply line 17 to the return line 19.

The valve element can be returned to open position manually by pulling on a flexible cable 46 by an appropriate conventional means.

A battery 47 which may be the conventional battery of a motor vehicle is made use of to energize the solenoid 45. It is significant that an electric lead 48 is connected to a switch point 49 which is the switch point of the starter switch of the engine of the vehicle on which the valve device is mounted. For illustrative purposes there is also identified a switch point 50 which is connected to the ignition system of the vehicle and which is closed by the armature 51 when the key is turned to a position which starts the engine. One solenoid connection goes to the battery 47 and the other to ground. Normally in an automotive engine the ignition key is moved by a spring 52 out of engagement with the starter switch. Consequently, when the engine is started the solenoid 45 is energized only temporarily, sufficient to disengage the detent, whereafter the solenoid is de-energized and the armature 51 is returned to a position of engagement with only the ignition switch point 50. Arranged in this fashion it will be clear that in the event the operator might neglect to turn off the main liquid gas supply the supply will automatically be shut off the moment the operator starts the engine of the vehicle. Subsequently when the liquid gas line is again to be put in service the valve device can be opened by merely pulling on the cable 46.

As an additional precaution, in the event of high pressure surges in the liquid gas supply line 17, there is provided a pressure sensitive valve device 55. This consists of a casing 56 having a chamber 57 therein through which the liquid gas supply line 17 passes. A diaphragm 58 has connected to it an armature 59 adapted when actuated to move against respective contact points 60 and 61. The contact point 61 is connected through a line 62 to ground and the contact point 60 is connected through a line 63 to the electric lead 48 which interconnects with the solenoid 45 through the battery 47, bypassing the switch point 49. A spring 64 is of such strength and sensitivity that it acts against the diaphragm 58 with some force sufficient to hold the armature 59 out of engagement with the contact points 60 and 61 but in a position responsive to surges in pressure in the chamber 57. In a circuit of the type described, should there be any unexpected and unwanted high pressure surges of liquid petroleum gas in the liquid gas supply line 17, while the valve element 21 is in open position the pressure will be sufficient to shift the diaphragm 58 in a direction from left to right as viewed in FIG. 1 far enough to engage both contact points 60 and 61 whereupon the solenoid is energized and the valve element 21 moved to shut off position thereby cutting flow of the liquid petroleum gas.

Once the surge point is passed the gas line then can be opened in the manner heretofore described namely manually by pulling on the cable 46.

In a second embodiment of the invention illustrated in FIG. 3 there is provided a temporary detent consisting of permanent magnets 70 and 71. The permanent magnets are contained in respective bores 72 and 73 wherein they are adjusted in proper position by means of set screws 74 and 75 respectively. The positions of the permanent magnets are adjusted so that they permit the valve stem 22' to slide freely in its bore 25. In this instance a portion 76 of the valve stem 22' is magnetic thereby to complete the magnetic circuit from one permanent magnet to the other. The valve stem and accordingly the valve element 21 can in that way be held magnetically in releasable open position. The magnetic circuit however is made not strong enough to resist movement of the valve stem 22 when it is acted upon by the solenoid 45, moving the stem downwardly a distance such that the space between the permanent magnets is bridged by a plastic portion 77. The valve element 21 is held in closed position in the same manner as described in the embodiment of FIGS. 1 and 2 namely by action of the spring 27. When the valve element is to be returned to open position it is shifted manually by pulling on the cable 46 thereby to return the valve stem 21 to the position of FIG. 3. In the last described position the metallic portion 76 is again at a location bridging the space between the permanent magnets 70 and 71.

Having described this invention, what is claimed as new in support of Letters Patent is:

1. A semiautomatic valve device for a liquid line comprising a housing having a valve chamber therein, an inlet port and an outlet port in communication between the valve chamber and the exterior, a valve seat located between the chamber and the outlet port, a valve element reciprocatably mounted in said chamber for movement between open and closed positions, a stem on said valve element slidably mounted in said housing and accessible from the exterior, a solenoid mounted in said housing having a bore therethrough adapted to reciprocatably receive said valve stem acting as a plunger, and a temporary detent in said housing in releasable engagement with the valve stem when the valve element is in open position, and an electric circuit having a primary switch therein operable when said primary switch is closed to energize said solenoid and effect release of said temporary detent and closing of said valve device, a seal member of flexible material in the chamber separating said valve element from said valve seat, said seal comprising a transverse portion located clear of both said valve seat and said valve element in open position of the valve element and being in engagement simultaneously with said valve seat and said valve element in closed position of the valve, said seal having a resilient side wall structure adapted to elongate and contract with movement of said valve element, said housing comprising a first section in which said solenoid and said valve stem are located and a second section having a releasable engagement with the first section, said second section having a portion of said chamber therein, said seal being anchored in sealing engagement at the perimeter thereof with one only of said sections at the wall of said chamber.

2. A semiautomatic valve device as in claim 1 wherein the seal is anchored in sealing engagement with the first section of the housing.

3. A semiautomatic valve device for a liquid line comprising a housing having a valve chamber therein, an inlet port and an outlet port in communication between the valve chamber and the exterior, a valve seat located between the chamber and the outlet port, a valve element reciprocatably mounted in said chamber for movement between open and closed positions, a stem on said valve element slidably mounted in said housing and accessible from the exterior, a solenoid mounted in said housing having a bore therethrough adapted to reciprocatably receive said valve stem acting as a plunger, and a temporary detent in said housing in releasable engagement with the valve stem when the valve element is in open position, and an electric circuit having a primary switch therein operable when said primary switch is closed to energize said solenoid and effect release of said temporary detent and closing of said valve device, said detent comprising a permanent magnet in said housing in fixed position relative to said valve seat, a metal portion on the valve stem adapted to be located adjacent the magnet when the valve element is in open position and a non-magnetic portion of the valve stem adapted to be located adjacent the magnet when the valve element is in closed position.

4. A semiautomatic valve device as in claim 3 wherein there is an elongated bore in said housing in which said valve stem has a smooth sliding guided relationship throughout all positions thereof.

* * * * *